United States Patent [19]

Nopper

[11] 4,115,702
[45] Sep. 19, 1978

[54] DEVICE FOR MEASURING AT LEAST ONE DIMENSION OF AN OBJECT AND A METHOD OF OPERATING SAID DEVICE

[75] Inventor: Peter Nopper, Lyss, Switzerland

[73] Assignee: Zumback Electronic AG, Orpund, Switzerland

[21] Appl. No.: 790,182

[22] Filed: Apr. 25, 1977

[30] Foreign Application Priority Data

May 5, 1976 [CH] Switzerland .......................... 5607/76

[51] Int. Cl.² ............................................. G01N 21/30
[52] U.S. Cl. .................................... 250/560; 356/159
[58] Field of Search ............... 356/159, 160, 165, 168; 250/560, 561, 237, 208, 209

[56] References Cited

U.S. PATENT DOCUMENTS

| 3,749,500 | 7/1973 | Calson et al. ........................ 356/160 |
| 3,806,251 | 4/1974 | Dandliker et al. .................... 356/159 |
| 4,021,119 | 5/1977 | Stauffer .............................. 356/159 |
| 4,037,103 | 7/1977 | Ryden ................................. 250/560 |

Primary Examiner—David C. Nelms

[57] ABSTRACT

A device for measuring at least one dimension of an object comprises two light channels of which one is intended to receive the object and the other serves as a reference channel. Light from the two channels is conducted to respective photo-electric transducers the outputs of which are connected to a comparison circuit. The relationship between the relative intensities of illumination of the transducers provides a measure of the dimension of the object. In order to improve the response characteristics of the transducers they are connected in parallel with mutually reversed polarity and the difference between the electric currents passed by the two transducers is compensated by negative feedback via a resistor connected to the output of an amplifier at the input of which the said transducers are connected.

25 Claims, 5 Drawing Figures

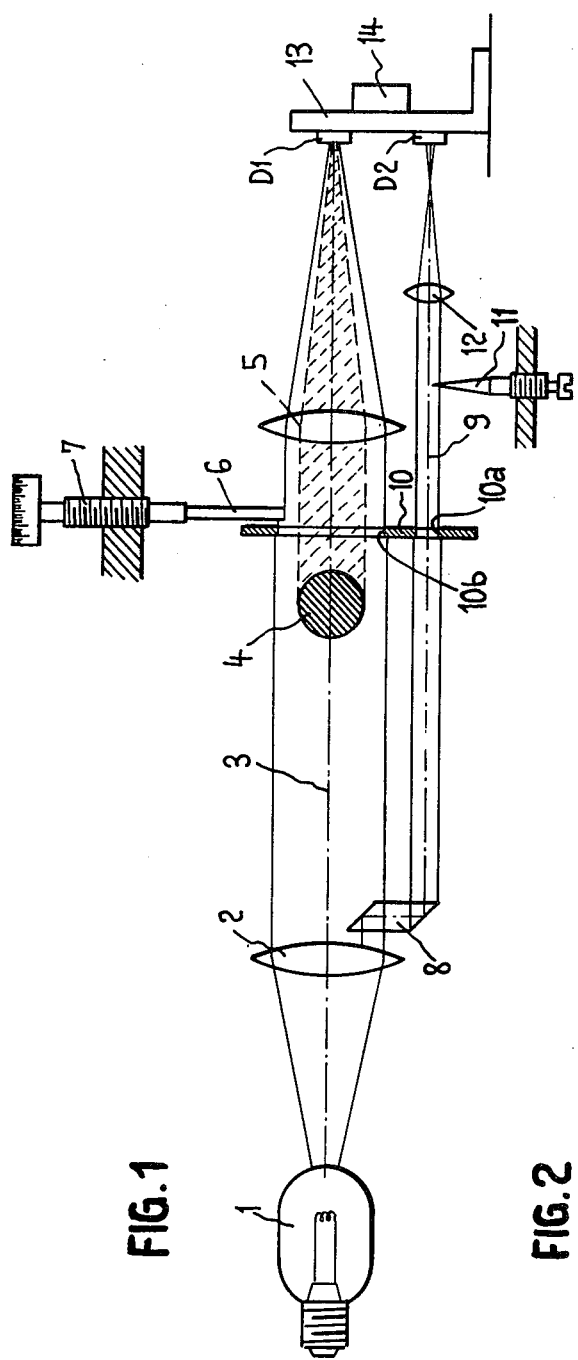
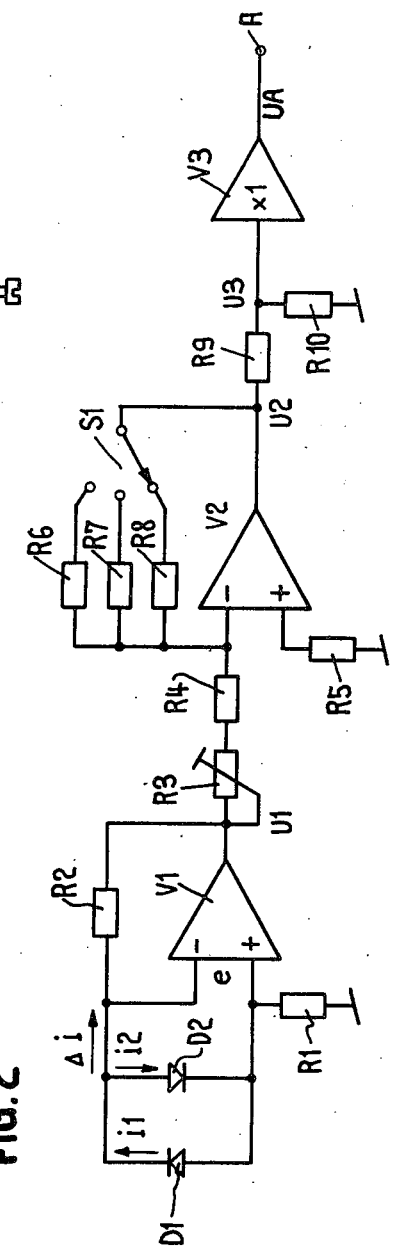
FIG. 1
FIG. 2

DEVICE FOR MEASURING AT LEAST ONE DIMENSION OF AN OBJECT AND A METHOD OF OPERATING SAID DEVICE

BACKGROUND OF THE INVENTION

Field of the Invention

The present invention relates to a device for measuring at least one dimension, more especially the diameter of an object, said device having two relatively adjustable light channels, of which one serves as a measuring channel into which the object is introduced and the other serves as a comparison channel, photo-electric transducers for generating electrical quantities representative of the intensity of the illumination passed by each of the light channels, and a comparison circuit for the electrical quantities.

Reference to Prior Art

Such devices are already known, for example from U.S. Pat. Nos. 2,548,755 and 3,141,057. However, for various reasons the known devices do not permit a simple accurate measurement to be made. In particular the indication obtained does not follow a linear function of deviation from a nominal dimension and, moreover, adequate temperature stability is lacking.

SUMMARY OF THE INVENTION

It is an object of the present invention by the adoption of simple methods and means to achieve a high accuracy and linearity of the measurement.

The device according to the invention is characterised by the feature that the photo-electric transducers are connected to the input of an amplifier of the compensation circuit in parallel and with their polarity mutually reversed with respect to one another, and the said amplifier is provided with a negative feedback resistance connected to its output and arranged to compensate the difference between the electric currents of the said two transducers.

By means of the device according to the invention, the result is achieved that the two photo-electric transducers, which are preferably photodiodes, effectively short circuit one another. It has been found that under these conditions a comparison measurement can be effected between the two diode currents, which has a practically linear characteristic because there exists a substantially linear relationship between the intensity of illumination and the diode current under short circuit conditions.

For further improving the measurement result it is preferable to maintain the photo-electric transducers at equal temperatures. For this purpose a thermostat can be provided, which maintains a common support for the photo-electric transducers at a temperature above or below the ambient temperature. It has been demonstrated that the temperature relationship of the photo-electric transducers, in particular of photodiodes, cannot be neglected if an accurate measurement is desired.

Preferably the measurement is so effected that at a nominal dimension of the object, the two light channels produce the same intensity of illumination of the photo-electric transducers, which are preferably matched. In this manner a particularly accurate measurement of the deviation from the nominal dimension can be obtained.

Preferably the voltage of the light source used for illuminating the two optical channels, and therewith the illumination intensity in these channels, is regulated to a constant value, which condition contributes to a high degree of accuracy and stability of the measuring device.

BRIEF DESCRIPTION OF THE DRAWINGS

FIG. 1 is an elevation in diagrammatic form of the optical portion of a device in accordance with the invention, FIG. 2 is a circuit diagram of the essential portion of the electronic measuring circuit of the device shown in FIG. 1.

DETAILED DESCRIPTION OF THE PREFERRED EMBODIMENTS

Figure 3:
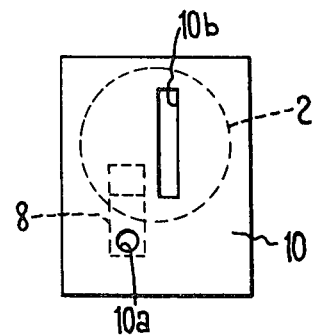
FIG. 3 is a view of a diaphragm incorporated in the device of FIG. 1.

Referring to the drawings, the device shown includes a light source 1 and an optical element 2 for producing a parallel light beam in a measuring channel identified by the optical axis 3. An object 4 which is to be measured, for example a wire, a cable or the like, or a standard object, can be introduced into this measuring channel in a stationary position, or may be transported transversely through the axis 3. By means of the optical element 5 the light issuing from the measuring channel can be projected onto a photo-electric transducer, in the present case a photodiode D1, preferably a silicon photodiode. The intensity of illumination in the measuring channel can be finely adjusted by means of a diaphragm 6, which can be regulated by a micrometer 7.

In the region of the optical element 2 there is situated a double prism 8, which deflects a part of the parallel light beam laterally and forms a comparison channel having an optical axis 9. In this comparison channel there is situated a diaphragm opening 10a, a control cone 11 operable by a micrometer screw, and an optical element 12, which projects the light from the comparison channel onto a photodiode D2 similar to the photodiode D1.

The diaphragm aperture 10a is located in a diaphragm 10 (FIG. 3), which also has a diaphragm aperture 10b. The diaphragm apertures 10a and 10b determine the cross-sections of the light beams available for measurement determination in the two optical channels, and are so arranged that these light beams are completely separated from each other, being taken from different sections of the original beam via the optical element 2 and the double prism 8. In the arrangement shown the diaphragm aperture 10b can extend over such a portion of the diameter of the optical element 2 that the diameter of the optical element 2 requires to be only slightly greater than the upper limit of the measuring range determined by the length of the aperture 10b.

The two diodes D1 and D2 are carried upon a common support 13 of good thermal conductivity, for example copper, which is heated by a heater element and controlled by a control circuit, not shown in the drawing, whereby the two diodes D1 and D2 are maintained at an equal temperature. In the present case this temperature is maintained sufficiently above the ambient temperature that for all cases which occur the two diodes will be practically at the same temperature. Alternatively, the diodes could be cooled to a constant temperature, for example by means of Peltier elements. As shown in FIG. 2 the diodes D1 and D2 are connected in reversed parallel relationship to the input of an operational amplifier V1. A compensating resistance R1 and a negative feedback resistance R2 are associated with this amplifier. These resistances are of a similar order of magnitude and are so dimensioned that the negative feedback resistance R2 compensates the current difference $\Delta i = i1 - i2$ of the two photodiodes D1 and D2. The output of the operational amplifier V1 is connected through a variable resistance R3 and a fixed resistance R4 to one input of a measuring amplifier V2. With this measuring amplifier there are associated a compensating resistance R5 and, for selecting the amplification range, selectively switchable negative feedback resistances R6, R7 and R8, which can be selected by means of a range switch S1. The gain of the amplifier V2 is so designed that it saturates at a level control of over 100% of the preselected range. Following the amplifier, the voltage divider formed by the resistance R9 and R10 divides the output voltage U2 of the amplifier V2 in such a manner that the input voltage U3 at a buffer amplifier V3 is satisfied at 100% of the demanded normal voltage. The buffer amplifier V3 has an amplification factor of 1, so that the output voltage $U_A$ is equal to the voltage U3, and this output voltage can be further amplified as a normalised measuring value. The output value is limited by the saturation of the amplifier V2.

For the measurement of a dimension, in particular the diameter of an object, the device described above is prepared and operated as follows:

The light source 1 is switched into circuit and is preferably regulated to constant intensity of illumination by means not shown in the drawing. In the manner shown in the drawing the light proceeds in the one case through the measuring channel and in the other case through the comparison channel to the photodiodes D1 and D2. By means of the micrometer 7 the diaphragm 6 is brought into its zero position, i.e. the diaphragm 6 is closed until the micrometer 7 reaches an end position corresponding to a zero diameter. Then by axial adjustment of the regulating cone 11 in the comparison channel, the light intensity in this channel is adjusted until the value indicated by the measuring circuit becomes zero. Thereby the adjusting operation is completed. For performing the measurement, the diaphragm 6 is opened until the micrometer 7 is brought into the position corresponding to a desired nominal value of an object to be measured. When the object to be measured is then introduced into the light beam the output value of the measuring circuit will again be zero when the dimension of the object corresponds to said nominal value.

If special compensation to absolute accuracy is required in a certain measuring range, instead of adopting the adjusting procedure described above, a standard object having a nominal diameter is introduced into the measuring channel and the diaphragm 6 is brought by means of the micrometer 7 into the position corresponding to the nominal dimension. For this adjustment the indication at the indicating instrument is now brought to zero by adjustment of the regulating cone 11. For the purpose of calibrating the sensitivity of the measuring circuit a predetermined deviation from the nominal value may be set by means of the micrometer 7. By means of the controllable resistance R3, the output voltage U3 of the measuring circuit can be balanced to correspond with said predetermined deviation.

After completing one or the other of the above described adjusting operations the device is prepared for the measurement, and in the latter case instead of introducing a standard object, an object to be measured is introduced into the measuring channel. If the diameter of the object to be measured corresponds precisely to that of the previously introduced standard object, then the indication will stand at zero, i.e. the deviation from the nominal dimension is zero. In the case where the dimension of the object 4 to be measured is too great or too small then the illumination intensity at the diode D1 is lower or higher, and consequently the photo-current in that diode is lower or higher, than that in the comparison diode D2. There is then produced a current difference $\Delta i$, which is compensated in the above described manner by the negative feedback of the operational amplifier V1, so that at the amplifier input the voltage e appears, which tends to the zero value. In this way the result is achieved that the two diodes D1 and D2 operate in a practically linear manner in the working range, and consequently the indication represents a direct measurement for the deviation from the nominal dimension in the positive or the negative sense. In other words the current difference $\Delta i = i1 - i2$ is compensated by the negative feedback current U1/R2, from which it follows that the output voltage U1 is proportional to the current difference $\Delta i$, and therefore also proportional to the difference between the illumination intensities at the diodes D1 and D2. The linearity and accuracy of the measurement and the indication is furthermore improved by the fact that the two photodiodes D1 and D2 are maintained thermostatically at an equal temperature, that the light intensity of the light source 1 is regulated, and that matched diodes are employed, which, at the nominal value, are subject to the same illumination intensity.

Figure 4:
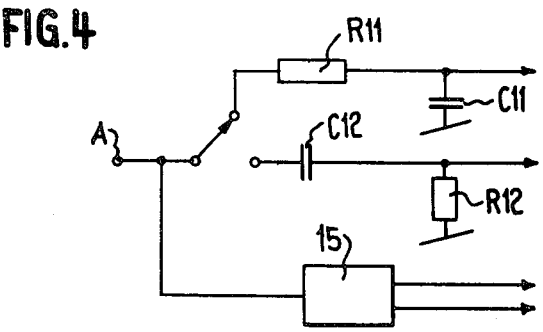
FIG. 4 is a circuit diagram of a circuit for use in conjunction with the measuring circuit of FIG. 2.

Any desired suitable accessory apparatus can be connected to the output A of the measuring channel according to FIG. 2. A direct indication can be achieved by means of a pointer instrument or a digital voltmeter. As shown in FIG. 4 it is possible, for example, selectively to switch into the measuring channel an integration member comprising a series resistance R11 and a parallel connected condenser C11 in order to suppress rapid variations. Alternatively it is possible to provide a differentiating member comprising a series condenser C12 and a parallel connected resistance R12 in order to ensure the detection of rapid variations such as are caused, for example, by the passage of junction points in the object to be measured, without slow variations in the nominal value having a disturbing influence on the measurement process. Furthermore the output may be connected to control means 15 serving, for example, in the case of cable production to control the draw-off speed and/or the quantity of insulating material supplied, in dependence upon the result of the measurement.

Figure 5:
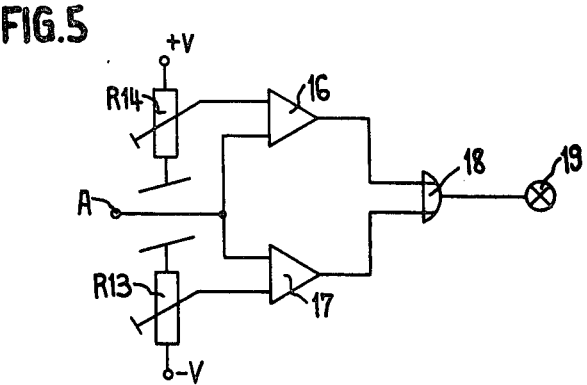
FIG. 5 is a further circuit diagram of a circuit for use in conjunction with the measuring circuit of FIG. 2.

It is also possible to provide a circuit for the supervision of tolerances as shown in FIG. 5, in which the measured value is compared with two adjustable prescribed values. A positive and a negative prescribed value, which are adjustable at the resistance R13 and R14 are delivered in each case to a respective one of two differential amplifiers 16 and 17, whilst the measured value, coming from the output A, is delivered to the two remaining inputs of the differential amplifiers. The outputs of the differential amplifiers are connected to the inputs of an OR gate 18, the output of which controls the indicator 19 or a suitable alarm device. If a certain tolerance value is exceeded in the positive or the negative sense, an output signal proceeds from an amplifier through the OR gate, whereby the fact that the tolerance has been exceeded is indicated and/or an alarm is operated. If the outputs of the amplifier 16 and 17 are taken out separately, then it is possible also to effect a correction.

The degree of tolerance and limiting value supervision is very efficient due to the high stability and limiting frequency of the continuosuly operating measuring device, and by virtue of the short response time of the tolerance supervision device itself. This results overall in the achievement of a very short response time, a high stability and accuracy of indication. The device for supervising the limiting value can also serve as an effective supervisor for the passage of junctions in the object being measured.

The above described balancing and calibrating operations can also be automated. For this purpose the micrometer 7 is connected to a servomotor, which is controlled by the measuring signal through a suitable control device. For zero compensation, starting without any object in the measuring channel, the diaphragm 6, controlled by the servomotor through the control device, is closed to such an extent that equal illumination intensity is achieved in the two optical channels. Thereafter the control cone 11 is so adjusted that the micrometer is brought to a zero position by the servomotor. Following this the servo system is switched out of action and the diaphragm 6 is opened up to the nominal dimension automatically by means of the servomotor under the action of a preselecting counter. After the introduction into the measuring channel of the object to be measured the deviation from the nominal value can be read off upon a special indicating instrument.

However, it is also possible for the preselecting counter, after the preselected nominal dimension has been achieved, to be reset to zero, whereupon an object to be measured is introduced into the measuring channel and the servo system is again connected into circuit. The diaphragm 6 is now automatically readjusted by the servo system so that the optical channels are balanced. The preselecting counter is connected as an up-and-down counter and detects the displacements of the diaphragm 6 about the nominal dimension null point in both directions. Accordingly the condition of the counter can be directly read off in digital form as a deviation from the nominal dimension.

The above described process for achieving the nominal value position can be modified in the sense that a standard object is introduced into the measuring channel, whereupon the diaphragm may be allowed to run automatically into the standard value position, which corresponds to the desired nominal value. The measurement and indication of the deviation from the nominal value can be effected, for example, as above described.

It is also possible, after carrying out the zero balancing of an object as above described, to allow the servo system and the counter to remain permanently in circuit, i.e. so that they continuosuly follow up the object to be measured. In this case the count condition would always indicate the measured absolute value, rather than the deviation from a nominal value.

As a further variant, the system having the absolute value indication could be supplemented by means of a further counter, which is set to zero at the nominal dimension and which thus detects the deviation from the nominal value as already described. The advantages of both of the described systems are thus combined.

Finally it is also possible during production, if necessary, to carry out a fresh zero balancing either manually or automatically. For this purpose it would be necessary temporarily to remove from the measuring position the travelling object to be measured, for example a cable. Then the diaphragm 6 is brought into the zero position and the balancing operation is carried out by bringing the count condition to zero. Thereafter the diaphragm is restored into the nominal dimension position. In the case of automatic adjustment of the diaphragm, the zero balancing and, after the reintroduction of the object to be measured into the optical measuring channel, the return of the diaphragm into the actual measured position can follow automatically.

We claim:

1. In a device for measuring at least one dimension of an object, comprising a light source, means defining two independent light channels for conducting light from said source to respective photo-electric transducers, means for adjusting the relative quantities of light transmitted by said channels, and a comparison circuit connected to the outputs of said transducers in order to compare the relationship between the intensities of illumination thereof, whereby when the object to be measured is introduced into one of said channels the dimension thereof can be determined in terms of the deviation of said relationship from a preset condition; the improvement wherein said photo-electric transducers are connected to the input of an amplifier of said circuit in parallel and with their polarity mutually reversed with respect to one another, and the said amplifier is provided with a negative feedback resistance connected to its output and arranged to compensate the difference between the electric currents of the said two transducers.

2. The improvement according to claim 1, wherein the photo-electric transducers are photodiodes.

3. The improvement according to claim 1, including means for maintaining the photo-electric transducers at equal temperatures.

4. The improvement according to claim 3, wherein the said means for maintaining the photo-electric transducers at equal temperatures comprises a common thermally conductive support upon which said transducers are arranged, and means for maintaining said support and said transducers at a temperature differing from ambient temperature.

5. The improvement according to claim 4, wherein the said temperature maintaining means includes a thermostatic control.

6. The improvement according to claim 1, wherein the said amplifier is an operational amplifier and the negative feedback resistance, the input of said amplifier and a compensating resistance are connected in series.

7. The improvement according to claim 6, wherein the negative feedback resistance and the compensating resistance have values of the same order of magnitude.

8. The improvement according to claim 1, wherein the said photo-electric transducers have matched characteristics.

9. The improvement according to claim 1, wherein the said comparison circuit includes a differentiating member for the purpose of detecting rapid variations of measured value whilst avoiding any disturbing influences due to slow variations in measured value.

10. The improvement according to claim 1, wherein the said comparison circuit includes an integrating member for the purpose of suppressing rapid variations in measured value.

11. The improvement according to claim 1, wherein the said device includes a tolerance supervision circuit for comparing the value of an output signal from said comparison circuit with two prescribed values lying below and above a nominal value, said tolerance supervision circuit being adapted to emit a warning signal when the said output signal exceeds or falls below one of the prescribed values.

12. The improvement according to claim 11, wherein the tolerance supervision circuit comprises two sources of potential representing the said prescribed values, two differential amplifiers each having a first input connected to the output of said comparison circuit and a second input connected to a respective one of said potential sources, and an OR gate, the inputs of which are connected to the outputs of said differential amplifier and the output of which delivers the said warning signal.

13. A device according to claim 1, including a servo-control mechanism for the automatic adjustment of the position of a diaphragm movable in the light channel intended to receive said object in order to control the intensities of illumination of said photo-electric elements to the same value.

14. A device according to claim 13, wherein the servo-control mechanism is coupled to an indicating system which indicates a measured value corresponding to the position of the movable diaphragm.

15. A device according to claim 14, wherein the servo-control mechanism includes a stepping servomotor.

16. A device according to claim 15, wherein a stepping counter is connected in parallel to the stepping servomotor, whereby the position of the counter corresponds to that of the stepping servomotor and the movable diaphragm.

17. A device for measuring at least one dimension of an object, comprising a light source; an optical element for producing parallel light rays from said light source; optical means for the lateral deflection of light beyond the ray path of said optical element; a diaphragm having diaphragm apertures defining respectively the cross-sections of a first light channel into which the object to be measured is to be introduced and comprising rays derived directly from said optical element, and the cross-section of a second light channel comprising rays derived via said optical means and serving as a reference channel, the said diaphragm apertures being so dimensioned and arranged that the paths of light rays proceeding from said source to the respective channels are mutually exclusive; means for adjusting the relative quantities of light transmitted by said channels; a pair of photo-electric transducers arranged to be illuminated by the light transmitted by the said two channels, respectively; and a comparison circuit connected to the outputs of said transducers in order to compare the relationship between the intensities of illumination thereof.

18. The device claimed in claim 17, wherein said transducers are connected to the input of an amplifier of said circuit in parallel and with their polarity mutually reversed with respect to one another, and the said amplifier is provided with a negative feedback resistance connected to its output and arranged to compensate the difference between the electric currents of the said two transducers.

19. A device according to claim 18, wherein the diaphragm aperture defining the cross-section of the said first channel comprises a slit extending over substantially the whole diameter of said optical element, and the said optical means for deflecting the light into the second channel is arranged laterally with respect to the beam path defined by the said slit.

20. A device for measuring at least one dimension of an object, comprising a light source; means defining a first light channel for light rays from said source and having a cross-section in the shape of a slit; means defining a second light channel of substantially smaller cross-section than the first; a diaphragm leaf mounted for movement in the direction of the major dimension of said first light channel; a micrometer coupled to said diaphragm leaf for effecting measured movement thereof; means for finely adjusting the cross-section of said second light channel; a pair of photo-electric transducers arranged to be illuminated by the light transmitted by the said two channels respectively; and a comparison circuit connected to the outputs of said transducers in order to compare the relationship between the intensities of illumination thereof.

21. The device claimed in claim 20, wherein said transducers are connected to the input of an amplifier of said circuit in parallel and with their polarity mutually reversed with respect to one another, and the said amplifier is provided with a negative feedback resistance connected to its output and arranged to compensate the difference between the electric currents of the said two transducers.

22. A method of pre-adjusting a device as claimed in claim 20, wherein a standard object is introduced into said first channel, said object having a nominal dimension in the direction of the major dimension of said slit, the said micrometer is adjusted into a position corresponding to said nominal dimension, the fine adjusting means of said second channel is adjusted to balance the output of said comparison circuit to a null condition, and the standard object is removed.

23. A method of pre-adjusting a device as claimed in claim 20, wherein the said micrometer is adjusted to a zero position corresponding to the position of maximum reduction of the dimension of said slit, and the said fine adjustment means is adjusted to balance the output of said comparison circuit to a null condition.

24. A method as claimed in claim 22, wherein during the measurement of an object proceeding from a production line the said balance of the comparison circuit to a null condition is effected after removing the object from the said first channel or swinging the optical path of said channel away from the object.

25. A method as claimed in claim 23, wherein during the measurement of an object proceeding from a production line the said balance of the comparison circuit to a null condition is effected after removing the object from the said first channel or swinging the optical path of said channel away from the object.

* * * * *